(12) United States Patent
Sooklal

(10) Patent No.: US 7,606,758 B1
(45) Date of Patent: Oct. 20, 2009

(54) DYNAMIC STOCK REPURCHASE MODEL

(75) Inventor: Jainaryan Sooklal, Chatham, NJ (US)

(73) Assignee: Morgan Stanley, New York, NY (US)

( * ) Notice: Subject to any disclaimer, the term of this patent is extended or adjusted under 35 U.S.C. 154(b) by 617 days.

(21) Appl. No.: 11/022,085

(22) Filed: Dec. 22, 2004

(51) Int. Cl.
*G06Q 40/00* (2006.01)
(52) U.S. Cl. ...................................... 705/36 R; 705/35
(58) Field of Classification Search ................... 705/37, 705/35–36 R
See application file for complete search history.

(56) References Cited

U.S. PATENT DOCUMENTS

2005/0149427 A1 * 7/2005 Meehan et al. ................ 705/37

OTHER PUBLICATIONS

Josh Charlson, "Stock Buybacks," printed from http://www.news.morningstar.com/news/MS/Stocks101/9809buybacks.html, Internet site, posted: Sep. 18, 1998, 4 pages.
Divine Capital Markets LLC, "Women-Owned Brokerage Film Extends Electronic Trading Service to Corporate Clients; Joint Venture with Former NYSE Governor Targets Fortune 500 Treasurers," Press Release dated Feb. 17, 2004, 3 pages.
Sturdivant&Co.—Institutional Services, informational sheet, 1 page.
* cited by examiner

*Primary Examiner*—Thu Thao Havan

(57) ABSTRACT

Various methods for constructing a model for a firm to repurchase stock of the firm are disclosed. The method may include estimating stock repurchase needs for the firm for at least a portion of a fiscal period; calculating a base stock repurchase amount associated with at least one trading period included within the fiscal period portion; calculating a base stock repurchase price associated with the stock of the firm; and constructing a stock repurchase model for generating an amount of stock to repurchase during the fiscal period portion based on the calculated base stock repurchase amount and the calculated base stock repurchase price.

16 Claims, 4 Drawing Sheets

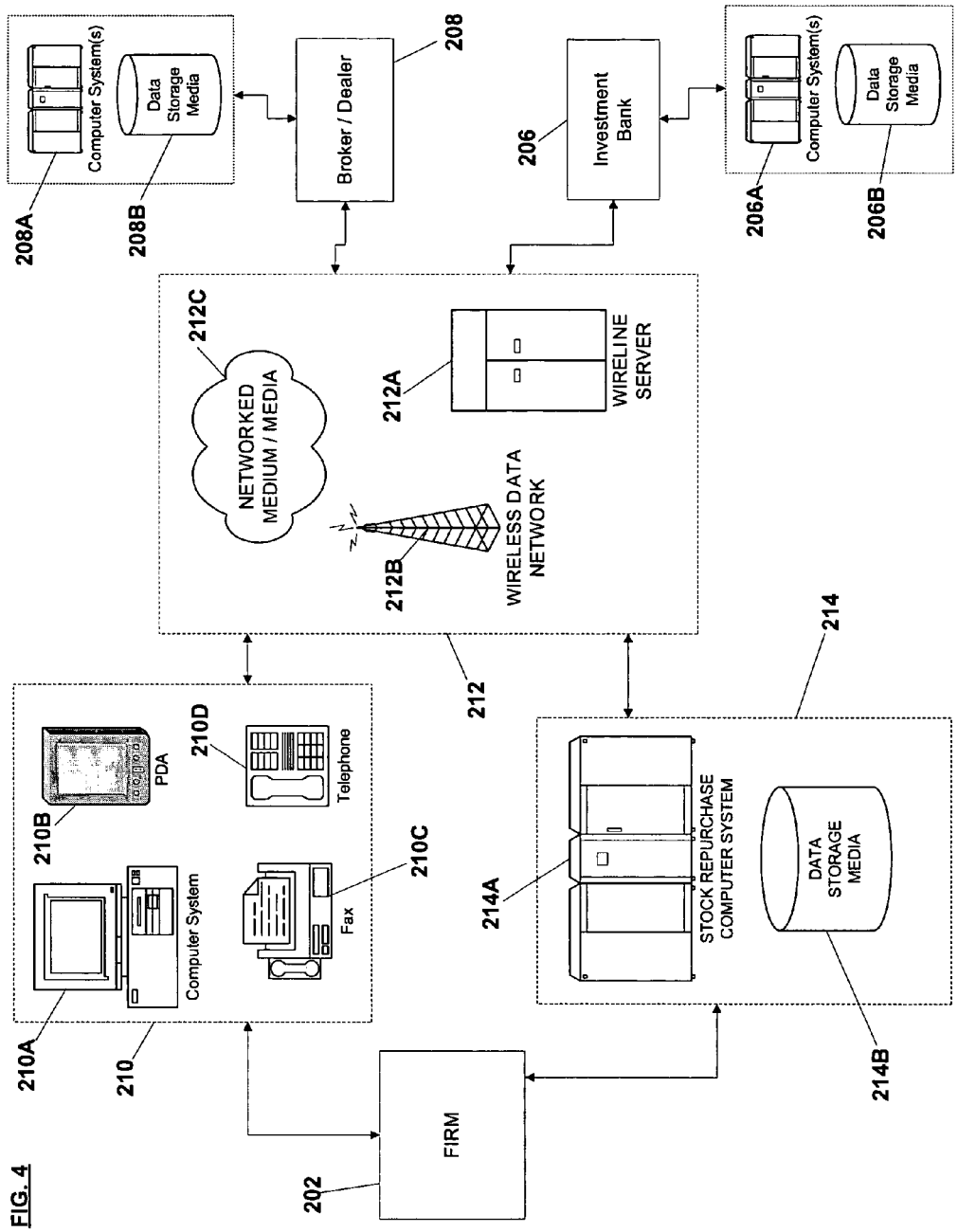

DYNAMIC STOCK REPURCHASE MODEL

BACKGROUND

Many firms have compensation plans that offer employees salary or bonuses in the form of options to purchase stock of the firm. To address stock dilution issues that may arise from such compensation plans, many firms employ stock repurchase programs to meet their stock needs. In another scenario, a firm might simply want to repurchase its own stock as the best use of its cash resources based on the market price of the stock. A firm might have surplus equity and choose to return that equity through a repurchase program based on buying a targeted amount of shares instead of paying a cash dividend, for example.

Typical stock repurchase programs do not account for volatility in the market price of the firm's stock, however, as it fluctuates over a fiscal period. When the firm's stock price is high on one trading day, the firm may repurchase too much stock at a premium level. When the firm's stock price is low on another trading day, the firm may not repurchase enough stock to take full advantage of the discounted price of the stock. Therefore, an improved, more dynamic stock repurchase strategy is needed to address the shortcomings of existing stock repurchase programs.

SUMMARY

The present invention offers various methods for constructing a model that can be employed by a firm to repurchase stock of the firm. In various embodiments, the method may include estimating stock repurchase needs for the firm for at least a portion of a fiscal period; calculating a base stock repurchase amount associated with at least one trading period included within the fiscal period portion; calculating a base stock repurchase price associated with the stock of the firm, wherein the base stock repurchase price may be calculated using a volume weighted average price with a suitable lookback period.

The method may further include constructing a stock repurchase model for generating an amount of stock to repurchase during the fiscal period portion based on the calculated base stock repurchase amount and the calculated base stock repurchase price. The stock repurchase model may include at least one stock price increase purchase band and at least one stock price decrease purchase band for use in recommending amounts of stock to be repurchased by the firm. The purchase bands may include multipliers for enhancing or decreasing the amount of firm stock recommended for repurchase by the firm as a function of changes in the market price of the firm's stock relative to the calculated base stock purchase price. At least one stock price decrease purchase band may incorporate a limitation on the amount of the firm's stock that can be repurchased for a given trading period.

In certain embodiments, the present invention may include splitting the fiscal period into at least an initial fiscal period portion and a final fiscal period portion and applying the stock repurchase model to the initial fiscal period portion. The method may include repurchasing a percentage portion of the estimated stock repurchase needs of the firm during the initial fiscal period portion and then repurchasing the balance of the stock repurchase needs during the final fiscal period portion.

In addition, embodiments of the present invention may be implemented with or without using a computer, or only in part by using a computer. System and computer-readable media embodiments of the present invention are also disclosed.

Embodiments of methods for assisting a firm with constructing a stock repurchase model for the firm's stock are also provided.

Other embodiments of the present invention will become apparent to those skilled in the art upon review of the following description and figures. It is intended that all such additional embodiments be within the scope of the present invention and be protected by the claims.

DESCRIPTION

As applied herein, the term "firm" includes any entity such as a financial institution, corporation, company or other entity capable of issuing or repurchasing stock or other equity-related instruments.

Figure 1:
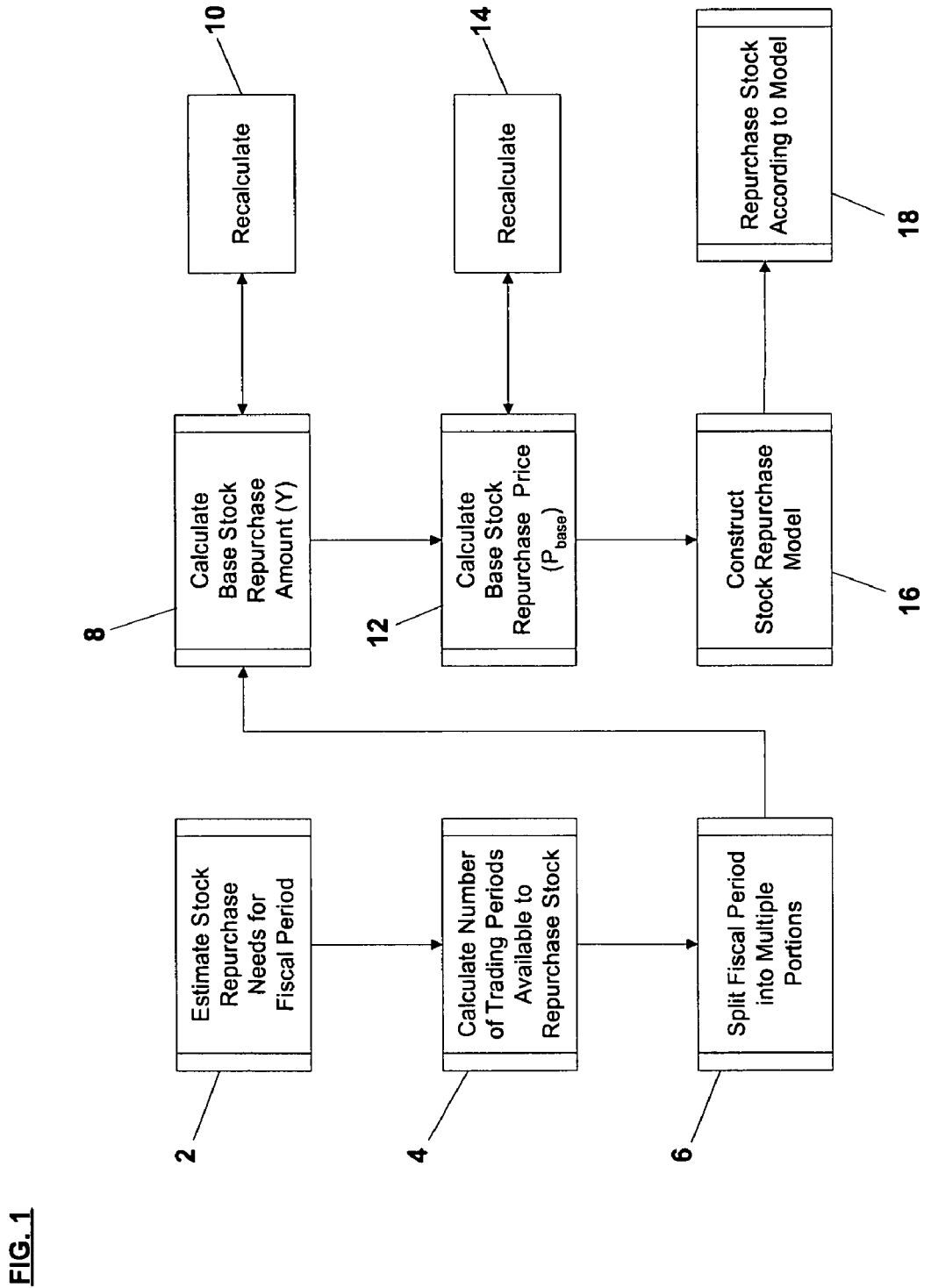
FIG. 1 includes a process flow diagram illustrating an exemplary method provided in accordance with various aspects of the present invention.

With reference to FIG. 1, a process flow diagram illustrates a method provided in accordance with the present invention for constructing a model that can be employed by a firm for repurchasing stock of the firm. At step 2, the firm estimates its stock repurchase needs for a given fiscal period (e.g., a fiscal year). Examples of needs that may be factored into the estimate of step 2 include, without limitation, the projected amount of the firm's stock that will be purchased through exercise of stock options (e.g., employee stock options) during the fiscal period; the projected amount of the firm's stock that will be needed to meet end-of-period compensation, bonuses and/or other performance-based awards that include a grant of options to purchase the firm's stock; and/or, various other factors that may involve purchase of the firm's stock. It can be appreciated that the fiscal period selected by the firm may be a fiscal year, for example, or any other fiscal period suitable for practice of the present invention. It can be appreciated that the firm may re-perform the estimating function of step 2 at various points throughout the fiscal period as the stock repurchase needs of the firm change from time to time.

At step 4, the number of trading periods (e.g., trading days) that will be available to the firm in the fiscal period can be calculated. Factors that affect how many trading periods will be available in a fiscal period include, for example, the number of business days in the fiscal period, the number of holidays or other scheduled non-business days in the fiscal period, and/or how many days in the fiscal period that will be blacked out for the release of earnings statements or other corporate events.

At step 6, an optional step of splitting the fiscal period into multiple portions may be performed by the firm. For example, splitting the fiscal period into two or more portions results in at least an initial fiscal period portion and a final fiscal period portion. The split allows application of the stock repurchase model (discussed below) to repurchase a portion of the firm's stock repurchase needs during the initial fiscal period portion. The balance of the firm's stock repurchase needs may then be repurchased during the final fiscal period portion to ensure that at least some firm stock is repurchased during the fiscal period. For example, the firm may decide that about 70% of its stock repurchase needs will be governed by the stock repurchase model during an initial fiscal year portion (e.g., the initial nine months), and the balance of its needs (i.e., about 30%) will be repurchased during the final fiscal year portion (e.g., the final three months). One objective of step 6 is to promote repurchase of at least some firm stock during the fiscal period, especially if the model advises against repurchasing stock during the initial fiscal period portion. It can be seen that splitting the fiscal period, and repurchasing a portion of the firm's stock repurchase needs during the final fiscal period portion, can be employed advantageously to match end-of-fiscal-period needs (e.g., bonus or incentive compensation awards of stock options) with treatment of those final portion transactions by the firm for accounting and/or tax purposes.

At step 8, a base stock repurchase amount (referred to herein as "Y" for convenience of disclosure) can be calculated for use in the stock repurchase model (see below). The value Y represents an amount of the firm's stock to be repurchased during each trading period. It can be seen that the value of Y is a function of at least the firm's stock repurchase needs estimated in step 2 and the number of trading periods available to repurchase stock as calculated in step 4. The Y value may also be impacted by the firm's decision to employ or not employ splitting of the fiscal period as described above in the context of step 6. It can be appreciated that the Y value may be recalculated in step 10 throughout the fiscal period as stock repurchase needs of the firm change from time to time.

In an example of the operation of step 8 that does not employ the fiscal period splitting of step 6, Y can be calculated as the total estimated stock repurchase needs for the fiscal period divided by the calculated number of trading periods available in the fiscal period. For example, if the firm estimates that it needs to repurchase 2 million shares of firm stock during a fiscal year having 200 available trading days, then Y can be calculated as 2 million divided by 200 trading days to provide a Y value of 10,000 shares per trading day.

In an example of the operation of step 8 that involves the fiscal period splitting of step 6, Y can be calculated as the total estimated stock repurchase needs for the predetermined initial fiscal period portion divided by the calculated number of trading periods available in the initial fiscal period portion. For example, the firm may decide to split a fiscal year into an initial nine-month portion and a final three-month portion (in accordance with step 6). The firm also decides to address 50% of its stock repurchase needs in the initial nine-month portion and the other 50% of its needs in the final three-month portion. Assuming that the firm needs to repurchase 2 million shares of firm stock during a fiscal year having 200 available trading days (and assuming 150 trading days are in the initial portion and 50 trading days are in the final portion), then Y can be calculated as 50% of 2 million divided by 150 trading days to provide a Y value of about 6,667 shares per trading day to be repurchased during the initial nine-month portion of the fiscal year.

At step 12, a base stock repurchase price (referred to herein as "$P_{base}$" for convenience of disclosure) can be calculated for use in the stock repurchase model of the present invention. The value of $P_{base}$ represents a target for the price at which the calculated Y amount of the firm's stock will be repurchased by the firm pursuant to the stock repurchase model (see below) for each trading period. In various embodiments, the value for $P_{base}$ can be calculated using a volume weighted average price ("VWAP") for the firm's stock for a predetermined look-back period of time. Historical market prices for the firm's stock may be obtained from a suitable market or exchange such as the NYSE, for example. The look-back period of time may be, for example and without limitation, at least a six-month period, at least a one-year period, at least a two-year period, at least a three-period, or another suitable time period. Factors that are considered in selecting a suitable look-back period may vary from firm to firm, subject to circumstances that have impacted the firm such as a merger, a sale of a major division or business unit, or another corporate event that might disproportionately skew the historical performance of the firm's stock price for calculation purposes in the stock repurchase model. Accordingly, for example, a firm may wish to use only a one-year look-back period, because of a merger that involved the firm a year and a half ago. In certain embodiments, the look-back period may include a continuous time period, a number of discontinuous periods of time, or a combination of both. Also, the value for $P_{base}$ may be recalculated in step 14 at periodic (e.g., weekly) or non-periodic times throughout the fiscal period to allow for a rolling average for calculating the VWAP, for example.

Figure 2:
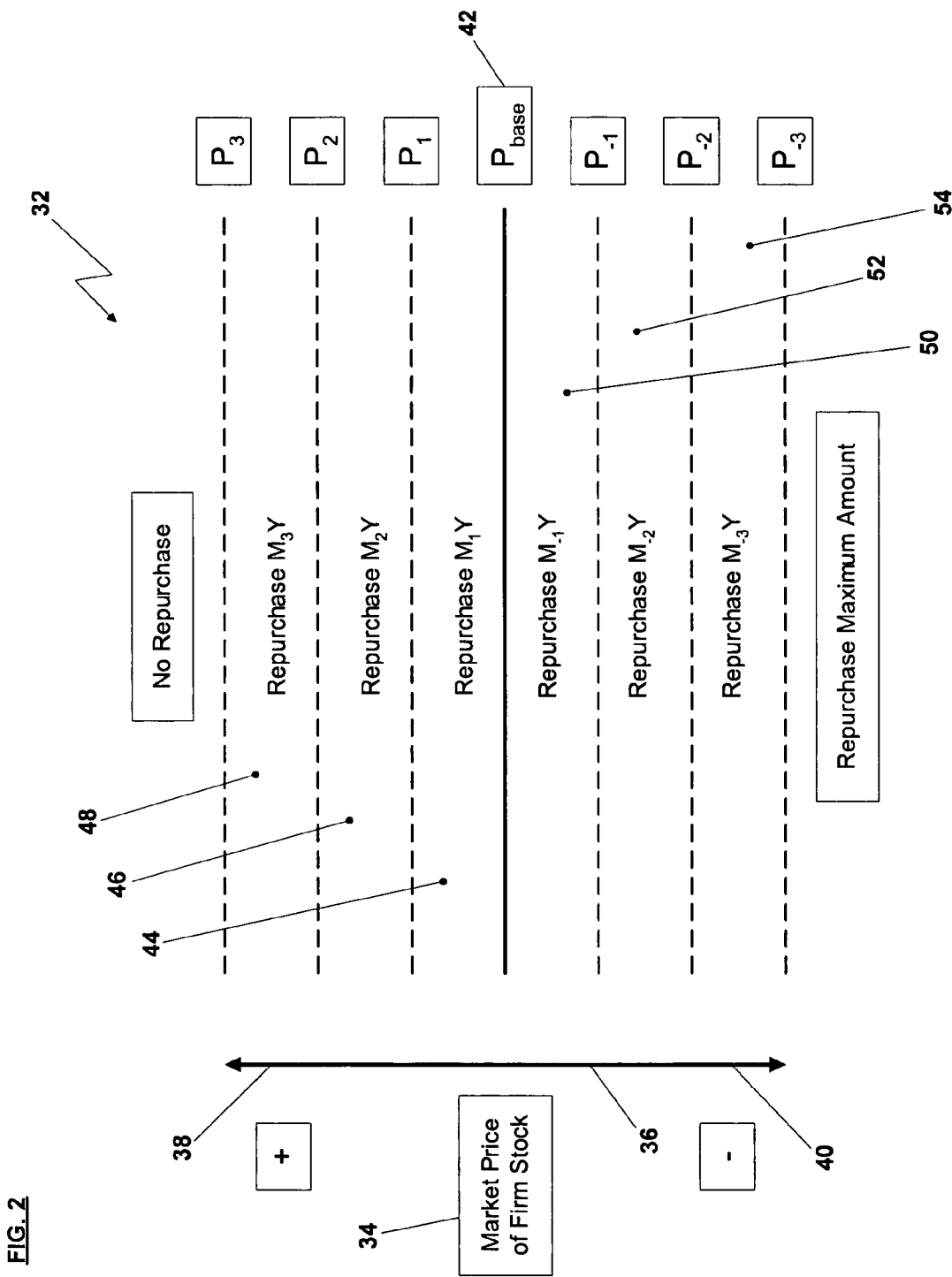
FIG. 2 includes a generalized schematic of a stock repurchase model constructed in accordance with various aspects of the present invention.

With reference to FIGS. 1 and 2, at step 16 a stock repurchase model 32 can be constructed in accordance with the present invention as shown schematically in FIG. 2. As shown, a market price 34 for stock of the firm is represented in the model 32 by a price continuum 36, including a price increase direction 38 and a price decrease direction 40. The zero point for the continuum 36 is set at the $P_{base}$ value 42 (as calculated in step 12, or recalculated in step 14—see above).

The model 32 further includes one or more stock price increase purchase bands 44, 46, 48 that can be configured based on a potential increase in the market price 34 of the firm stock relative to the $P_{base}$ price. The purchase bands 44, 46, 48 serve to indicate what amount of firm stock should be repurchased by the firm during a given trading period in which the market price 34 of the firm stock is higher than the $P_{base}$ price. The first purchase band 44 is defined by the $P_{base}$ price and a first market price $P_1$; the second purchase band 46 is defined by the first market price $P_1$ and a second market price $P_2$; and, the third purchase band 48 is defined by the second market price $P_2$ and a third market price $P_3$. It can be appreciated that the number of price increase purchase bands shown in the model 32 is for convenience of illustration only; the number of purchase bands can be suitably varied in the model 32 within the scope of the present invention. The market prices $P_1, P_2, P_3$ may represent some percentage or absolute value increase relative to the $P_{base}$ price. For example, price $P_1$ may represent a 10% increase of the $P_{base}$ price; $P_2$ may represent a 15% increase of the $P_{base}$ price; and $P_3$ may represent a 20% increase of the $P_{base}$ price.

Each of the price increase purchase bands 44, 46, 48 includes an associated rule governing the amount of firm stock to be repurchased subject to the market price 34 of the firm stock. For example, if the market price 34 of the firm stock falls within the first purchase band 44, the model 32 recommends repurchase of firm stock in the amount of Y (as calculated in step 8 or recalculated in step 10—see above) times a multiplier $M_1$. Likewise, if the market price 34 of the firm stock falls within the second purchase band 46, the model 32 recommends repurchase of firm stock in the amount of Y times a multiplier $M_2$. Furthermore, if the market price 34 of the firm stock falls within the third purchase band 48, the model 32 recommends repurchase of firm stock in the amount of Y times a multiplier $M_3$. The model 32 is configured such that if the market price 34 of the firm stock exceeds the price $P_3$, then no amount of firm stock is recommended for repurchase by the firm. Preferably, each of the multipliers $M_1, M_2, M_3$ may be a number of one or less, wherein $M_2$ may be less than $M_1$, and $M_3$ may be less than $M_2$. This reflects the general strategy that the firm should repurchase less shares of its stock as the market price 34 of the firm stock increases relative to the $P_{base}$ price.

In addition, the model 32 includes one or more stock price decrease purchase bands 50, 52, 54 that can be configured based on a potential decrease in the market price 34 of the firm stock relative to the $P_{base}$ price. The purchase bands 50, 52, 54 serve to indicate what amount of firm stock should be repurchased by the firm during a given trading period in which the market price 34 of the firm stock is lower than the $P_{base}$ price. The first purchase band 50 is defined by the $P_{base}$ price and a first market price $P_{-1}$; the second purchase band 52 is defined by the first market price $P_{-1}$ and a second market price $P_{-2}$; and, the third purchase band 54 is defined by the second market price $P_{-2}$ and a third market price $P_{-3}$. It can be appreciated that the number of price decrease purchase bands shown in the model 32 is for convenience of illustration only; the number of purchase bands can be suitably varied in the model 32 within the scope of the present invention. The market prices $P_{-1}$, $P_{-2}$, $P_{-3}$ may represent some percentage or absolute value decrease relative to the $P_{base}$ price. For example, price $P_{-1}$ may represent a 10% decrease of the $P_{base}$ price; $P_{-2}$ may represent a 15% decrease of the $P_{base}$ price; and $P_{-3}$ may represent a 20% decrease of the $P_{base}$ price.

Each of the price decrease purchase bands 50, 52, 54 includes an associated rule governing the amount of firm stock to be repurchased subject to the market price 34 of the firm stock. For example, if the market price 34 of the firm stock falls within the first purchase band 50, the model 32 recommends the repurchase of firm stock in the amount of Y (as calculated in step 8 or recalculated in step 10—see above) times a multiplier $M_{-1}$. Likewise, if the market price 34 of the firm stock falls within the second purchase band 52, the model 32 recommends repurchase of firm stock in the amount of Y times a multiplier $M_{-2}$. Furthermore, if the market price 34 of the firm stock falls within the third purchase band 54, the model 32 recommends repurchase of firm stock in the amount of Y times a multiplier $M_{-3}$. The model 32 is also configured such that if the market price 34 of the firm stock falls below the price $P_{-3}$, then the firm may elect to purchase all of its stock repurchase needs for the fiscal period, or at least up to the maximum amount of firm stock which the firm is permitted to repurchase during the trading period. In certain embodiments, the model 32 includes limiting the amount of firm stock that can be repurchased by the firm during each trading period in view of applicable securities laws, regulations or other rules. Preferably, each of the multipliers $M_{-1}$, $M_{-2}$, $M_{-3}$ may be a number of one or greater, wherein $M_{-2}$ may be greater than $M_{-1}$, and $M_{-3}$ may be greater than $M_{-2}$. This reflects the general strategy that the firm should repurchase more shares of its stock as the market price 34 of the firm stock decreases relative to the $P_{base}$ price.

It can be appreciated that the model 32 may be reconstructed in step 16 subject to adjustments to the estimate of stock repurchase needs of the firm, calculation or recalculation of the base stock repurchase amount, calculation or recalculation of the base stock repurchase price, and/or other factors. At step 18, the firm can repurchase an amount of firm stock in accordance with the recommendations of the stock repurchase model 32 constructed in step 16.

Figure 3:
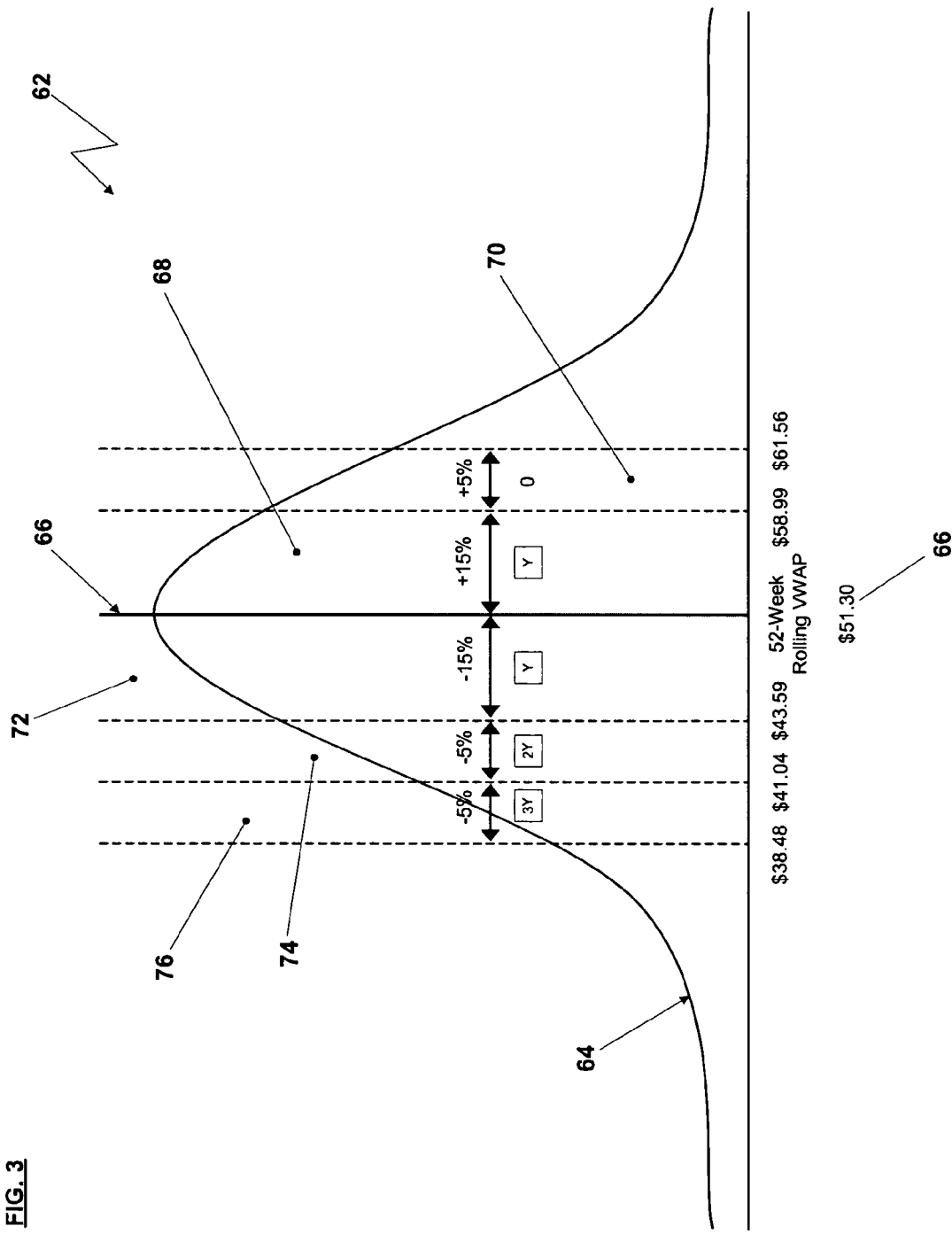
FIG. 3 includes a graphical representation of an example of a stock repurchase model constructed in accordance with the present invention; and, FIG. 4 includes a schematic system diagram illustrating various aspects of the present invention.

Referring now to FIG. 3, an example of a stock repurchase model 62 constructed in accordance with the present invention is shown. For convenience of illustration, the stock repurchase model 62 assumes a market price 64 for firm stock having a normal distribution. It will be understood, however, that actual market price fluctuations for the firm stock may not conform to a normal distribution. In this example, the base stock repurchase price ($P_{base}$) 66 is $51.30 on a Monday trading day in a given week of a fiscal year. The $P_{base}$ price 66 has been calculated using a 52-week rolling VWAP for the firm stock as of the Friday trading day of the prior week.

As shown, the exemplary model 62 includes two stock price increase purchase bands 68, 70. The first price increase purchase band 68 ranges from the $P_{base}$ price to a market price of $58.99, which represents up to a 15% increase in the $P_{base}$ price. If the market price 64 falls within this purchase band 68, the model 62 will recommend repurchasing firm stock in the amount of the base stock repurchase amount (as indicated by "Y" in the purchase band 68, i.e., a multiplier of one). The second price increase purchase band 70 ranges from the market price of $58.99 to a market price of $61.56, which represents up to a 20% increase in the $P_{base}$ price. If the market price 64 falls within this purchase band 70, the model 62 will recommend repurchasing no firm stock (as indicated by "0" in the purchase band 70, i.e., a multiplier of zero).

Also, the exemplary model 62 includes three stock price decrease purchase bands 72, 74, 76. The first price decrease purchase band 72 ranges from the $P_{base}$ price down to a market price of $43.59, which represents a 15% decrease range for the $P_{base}$ price. If the market price 64 falls within this purchase band 72, the model 62 will recommend repurchasing firm stock in the amount of the base stock repurchase amount (as indicated by "Y" in the purchase band 72, i.e., a multiplier of one). The second price decrease purchase band 74 ranges from the market price of $43.59 down to a market price of $41.04, which represents a 20% decrease range for the $P_{base}$ price. If the market price 64 falls within this purchase band 74, then the model 62 will recommend repurchasing firm stock in the amount of two times the base stock repurchase amount (as indicated by "2Y" in the purchase band 74, i.e., a multiplier of two). The third price decrease purchase band 76 ranges from the market price of $41.04 down to a market price of $38.48, which represents a 25% decrease range for the $P_{base}$ price. If the market price 64 falls within this purchase band 76, the model 62 will recommend repurchasing firm stock in the amount of three times the base stock repurchase amount (as indicated by "3Y" in the purchase band 76, i.e., a multiplier of three).

Referring now to FIG. 4, various exemplary system embodiments are provided in accordance with the present invention. As shown, a firm 202 may communicate and/or exchange data with one or more of an investment bank 206 and a broker/dealer 208. The firm 202 may be operatively associated with one or more communications devices 210 such as, for example and without limitation, a computer system 210A, a personal digital assistant 210B, a fax machine 210C, and/or a telephone 210D (e.g., a wireline telephone, a wireless telephone, a pager, and the like), and/or other like communication devices. The communication devices 210 permit the firm 202, the investment bank 206, and/or the broker/dealer 208 to communicate between/among each other through one or more communication media 212, such as by use of electronic mail communication or through one or more computer systems, for example. The communication media 212 may include, for example and without limitation, wireline communication means such as a wireline server 212A, a wireless data network 212B, and/or a connection through a networked medium or media 212C (e.g., the Internet).

In various embodiments of the invention, the firm 202, the investment bank 206, and/or the broker/dealer 208, may be operatively associated with one or more data processing/storage devices 214. As shown in FIG. 4, the firm 202 may be operatively associated with a stock repurchase computer system 214A, for example, and/or one or more data storage media 214B that can be configured to receive, store, analyze and/or otherwise process data in association with communications that occur between/among the firm 202, the investment bank 206, and/or the broker/dealer 208. The stock repurchase computer system 214A may also be configured to execute instructions and/or calculations in accordance with a stock repurchase model 32 constructed in accordance with the present invention. The stock repurchase computer system 214A may include a conventional spreadsheet software program for storing data and/or making calculations in accordance with the stock repurchase model 32.

In addition, the investment bank 206 may be operatively associated with one or more computer systems 206A and/or one or more data storage media 206B. For example, the investment bank 206 may employ a computer program that processes stock market data or executes a stock repurchase model in connection with assisting the firm 202 to plan or execute stock repurchase calculations or transactions in accordance with the present invention. Also, the broker/dealer 208 may be operatively associated with one or more computer systems 208A and/or one or more data storage media 208B. It can be appreciated that the computer systems 204A, 208A, 214A and the data storage media 204B, 208B, 214B may be employed to communicate, store, analyze, and/or otherwise process data related to financial transactions conducted between/among the firm 202, the investment bank 206, and/or the broker/dealer 208.

In various embodiments of the invention, the investment bank 206 may perform a variety of functions for the firm 202 in association with practice of the present invention. The investment bank 206 may assist the firm 202 with estimating stock repurchase needs for the firm for a fiscal period (such as in accordance with step 2 above); calculating a base stock repurchase amount (Y) associated with one or more trading periods in the fiscal period (such as in accordance with steps 8 and 10 discussed above); calculating a base stock repurchase price ($P_{base}$) associated with the stock of the firm (such as in accordance with steps 12 and 14 discussed above); and/or constructing a stock repurchase model for recommending amounts of firm stock to repurchase during the fiscal period.

Those skilled in the art will appreciate that various embodiments of the present invention may be applied to many situations that involve the repurchase of a firm's stock. The present invention may be applied to repurchase stock for a compensation plan offered by the firm, for example, in which options to purchase firm stock are offered to employees in the form of salary or bonuses. Embodiments of the present invention may also be employed by the firm to repurchase its own stock as the best economic use of its available cash resources. Also, a firm may have surplus equity and choose to return that equity through a stock repurchase program implemented in accordance with embodiments of the present invention.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, optical disk drives, and hard disk drives; memory storage that can be physical, virtual, permanent, temporary, semi-permanent and/or semi-temporary.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. No particular aspect of the examples is intended to limit the scope of the present invention.

It should be appreciated that all the figures are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A computer-implemented method for a firm to repurchase its stock according to a stock repurchase model for the firm, the method comprising:

estimating by a computer a quantity of shares of stock of the firm to be repurchased by the firm for at least a portion of a fiscal period, wherein the computer comprises a processor, a ROM, and a RAM;

calculating with the computer a non-zero, positive base stock repurchase amount associated with at least one trading period included within the fiscal period portion;

calculating with the computer a base stock repurchase price associated with the stock of the firm; and, constructing with the computer a stock repurchase model for generating an amount of stock to repurchase during the fiscal period portion based on the calculated base stock repurchase amount and the calculated base stock repurchase price, the stock repurchase model comprising at least one stock price increase purchase band and at least one stock price decrease purchase band, wherein the at least one stock price increase purchase band comprises a range of stock prices above the base stock repurchase price and the at least one stock price decrease purchase band comprises a range of stock prices below the base stock repurchase price, wherein the stock repurchase model outputs a non-zero, positive quantity of shares to repurchase during a trading period that is equal to or less than the base stock repurchase amount when a trading price for the stock during the trading period is greater than calculated the base stock repurchase price and is in the range of the at least one stock price increase purchase band, and wherein the stock repurchase model outputs a non-zero, positive quantity of shares to repurchase during a trading period that is equal to or greater than the base stock repurchase amount when the trading price during the trading period for the stock is less than the calculated base stock repurchase price and is in the range of the at least one stock price decrease purchase band.

2. The method of claim 1, further comprising repurchasing an amount of stock of the firm in accordance with the stock repurchase model.

3. The method of claim 1, further comprising splitting the fiscal period into at least an initial fiscal period portion and a final fiscal period portion and applying the stock repurchase model to the initial fiscal period portion.

4. The method of claim 1, wherein calculating the base stock repurchase price includes calculating a volume weighted average price to generate the base stock repurchase price.

5. The method of claim 4, wherein calculating the volume weighted average price includes evaluating a look-back period of at least about six months.

6. The method of claim 4, wherein calculating the volume weighted average price includes evaluating a look-back period of at least about one year.

7. The method of claim 1, further comprising recalculating the base stock repurchase price.

8. The method of claim 7, further comprising reconstructing the stock repurchase model based on the recalculated base stock repurchase price.

9. The method of claim 1, further comprising recalculating the base stock repurchase amount.

10. The method of claim 9, further comprising reconstructing the stock repurchase model based on the recalculated base stock repurchase amount.

11. The method of claim 1, further comprising limiting the amount of stock of the firm that can be repurchased by the firm during at least one of the trading periods.

12. The method of claim 1, wherein the at least one stock price increase purchase band comprises a first stock price increase purchase band and a second stock price increase purchase band, each stock price increase purchase band comprising a range of stock prices, wherein the range of stock prices of the first stock price increase purchase band is less than the range of prices of the second stock price increase purchase band, and wherein the quantity of shares to be repurchased by the firm when the trading price is in the first stock price increase purchase band is greater than the quantity of shares to be repurchased by the firm when the trading price is in the second stock price increase purchase band.

13. The method of claim 12, wherein the at least one stock price decrease purchase band comprises a first stock price decrease purchase band and a second stock price decrease purchase band, each stock price decrease purchase band comprising a range of stock prices, wherein the range of stock prices of the first stock price decrease purchase band is greater than the range of prices of the second stock price decrease purchase band, and wherein quantity of shares to be repurchased by the firm when the trading price is in the first stock price decrease purchase band is less than the quantity of shares to be repurchased by the firm when the trading price is in the second stock price decrease purchase band.

14. The method of claim 13, wherein the stock repurchase model outputs that no stock of the firm is to be repurchased when the trading price of the stock is above the range of stock prices of the second stock price increase purchase band.

15. A system for determining an amount of stock of a firm for the firm to repurchase, the system comprising:

a computer configured for calculating a non-zero, positive base stock repurchase amount associated with at least one trading period included within a fiscal period portion;

the computer being further configured for calculating a base stock repurchase price associated with the stock of the firm; and, the computer being further configured for constructing a stock repurchase model for generating an amount of stock of the firm for the firm to repurchase during the fiscal period portion based on the calculated base stock repurchase amount and the calculated base stock repurchase price, the stock repurchase model comprising at least one stock price increase purchase band and at least one stock price decrease purchase band, wherein the at least one stock price increase purchase band comprises a range of stock prices above the base stock repurchase price and the at least one stock price decrease purchase band comprises a range of stock prices below the base stock repurchase price, wherein the stock repurchase model outputs a non-zero, positive quantity of shares to repurchase during a trading period that is equal to or less than the base stock repurchase amount when a trading price for the stock during the trading period is greater than the calculated base stock repurchase price and is in the range of the at least one stock price increase purchase band, and wherein the stock repurchase model outputs a non-zero, positive quantity of shares to repurchase during a trading period that is equal to or greater than the base stock repurchase amount when the trading price during the trading period for the stock is less than the calculated base stock repurchase price and is in the range of the at least one stock price decrease purchase band.

16. A computer-readable medium comprising instructions which when executed by a processor cause the processor to:

calculate a non-zero, positive base stock repurchase amount associated with at least one trading period included within a fiscal period portion, wherein the base stock repurchase amount indicates the quantity of shares of stock of a firm the firm should repurchase per trading period during the fiscal period portion;

calculate a base stock repurchase price associated with the stock of the firm; and, construct a stock repurchase model for generating an amount of stock of the firm for the firm to repurchase during the fiscal period portion based on the calculated base stock repurchase amount and the calculated base stock repurchase price, the stock repurchase model comprising at least one stock price increase purchase band and at least one stock price decrease purchase band, wherein the at least one stock price increase purchase band comprises a range of stock prices above the base stock repurchase price and the at least one stock price decrease purchase band comprises a range of stock prices below the base stock repurchase price, wherein the stock repurchase model outputs a non-zero, positive quantity of shares to repurchase during a trading period that is equal to or less than the base stock repurchase amount when a trading price for the stock during the trading period is greater than calculated the base stock repurchase price and is in the range of the at least one stock price increase purchase band, and wherein the stock repurchase model outputs a non-zero, positive quantity of shares to repurchase during a trading period that is equal to or greater than the base stock repurchase amount when the trading price during the trading period for the stock is less than the calculated base stock repurchase price and is in the range of the at least one stock price decrease purchase band.

\* \* \* \* \*